US008359578B2

(12) United States Patent
Wang et al.

(10) Patent No.: US 8,359,578 B2
(45) Date of Patent: Jan. 22, 2013

(54) SYMBOLIC REDUCTION OF DYNAMIC EXECUTIONS OF CONCURRENT PROGRAMS

(75) Inventors: Chao Wang, Plainsboro, NJ (US); Aarti Gupta, Princeton, NJ (US); Swarat Chaudhuri, Unversity Park, PA (US); Yu Yang, Salt Lake City, UT (US)

(73) Assignee: NEC Laboratories America, Inc., Princeton, NJ (US)

( * ) Notice: Subject to any disclaimer, the term of this patent is extended or adjusted under 35 U.S.C. 154(b) by 770 days.

(21) Appl. No.: 12/571,476

(22) Filed: Oct. 1, 2009

(65) Prior Publication Data
US 2010/0088681 A1      Apr. 8, 2010

Related U.S. Application Data

(60) Provisional application No. 61/101,746, filed on Oct. 1, 2008.

(51) Int. Cl.
*G06F 9/44*         (2006.01)

(52) U.S. Cl. ........................................ 717/126; 717/128
(58) Field of Classification Search ........................ None
See application file for complete search history.

(56) References Cited

OTHER PUBLICATIONS

"The Road to Improving the Performance of Satisfiability Solvers Using HPC" James Ezick and Richard Lethin, Jun. 2007 (http://ieeexplore.ieee.org/xpl/articleDetails.jsp?reload=true&arnumber=4438019&contentType=Conference+Publications).*

* cited by examiner

*Primary Examiner* — Don Wong
*Assistant Examiner* — Deric Ortiz
(74) *Attorney, Agent, or Firm* — Jeffery Brosemer; Joseph Kolodka (57) ABSTRACT

A computer implemented method for the verification of concurrent software programs wherein the concurrent software program is partitioned into subsets named concurrent trace programs (CTPs) and each of the CTPs is evaluated using a satisfiability-based (SAT) symbolic analysis. By applying the SAT analysis to individual CTPs in isolation the symbolic analysis is advantageously more scalable and efficient.

10 Claims, 7 Drawing Sheets

```
T₀
    int x = 0;
    int y = 0;
    pthread_t t1, t2;
    main() {
t₁      pthread_create(t1,foo);
t₂      pthread_create(t2,bar);
t₃      pthread_join(t2);
t₄      pthread_join(t1);
t₅      assert( x != y);
    }
```

```
T₁
        foo() {
            int a;
t₁₁         a=y;
t₁₂         if (a==0) {
t₁₃             x=1;
t₁₄             a=x+1;
t₁₅             x=a;
t₁₆         }else
t₁₇             x=0;
t₁₈     }
```

```
T₂
        bar() {
            int b;
t₂₁         b=x;
t₂₂         if (b==0) {
t₂₃             y=1;
t₂₄             b=y+1;
t₂₅             y=b;
t₂₆         }else
t₂₇             y=0;
t₂₈     }
```

(below is the trace)

Thread $T_0$:        Thread $T_1$        Thread $T_2$ $t_0$: x=0,y=0;
$t_1$: fork(1)
$t_2$: fork(2)
----------------→
                     $t_{11}$: a=y;
                     $t_{12}$: assume(a=0)
                     $t_{13}$: x=1;
                     $t_{14}$: a=x+1;
                     $t_{15}$: x=a;
                     $t_{18}$:
                     ----------------→
                                         $t_{21}$: b=x;
                                         $t_{26}$: assume(b≠0)
                                         $t_{27}$: y=0;
                     ←----------------
                                         $t_{28}$:

$t_3$: join(2)
$t_4$: join(1)
$t_5$: assert($x \neq y$);

```
1: Initially: S is empty; let s₀ be the initial state; FUSION-
   SEARCH(S, s₀)

2: FUSION-SEARCH(S, s) {
3:   if (s.enabled = ∅) {
4:      if (CTP-CHECK-PROPERTY(S))          // check
5:         return bug-found;                 //
6:      CTP-PRUNE-BACKTRACKSETS(S);          // prune
7:   }
8:   else {
9:      S.push(s);
10:     s.backtrack ← {tid(t) | t ∈ s.enabled};
11:     s.done ← ∅;
12:     while (∃t ∈ s.enabled: tid(t) ∈ s.backtrack, and t ∉
   s.done) {
13:        s.done ← s.done ∪ {t};
14:        execute t, and let s' be a state such that s →ᵗ s';
15:        FUSION-SEARCH(S, s');
16:     }
17:     S.pop();
18:  }
19: }

20: CTP-CHECK-PROPERTY(S) {
21:    let ρ be the completed execution trace stored in S;
22:    let CTPρ be the concurrent trace program derived from ρ;
23:    if (Φ_{CTPρ} is satisfiable)
24:       return true;
25:    else
26:       return false;
27: }

28: CTP-PRUNE-BACKTRACKSETS(S) {
29:    let ρ be the completed execution trace stored in S;
30:    let CTPρ⁺ be the concurrent trace abstraction from ρ;
31:    let n be the length of ρ = t₁ ... tₙ;
32:    for (i = n − 1, ..., 1) {
33:       let s be the state in S before tᵢ ∈ ρ was executed;
34:       let pfx = t₁ ... tᵢ be the prefix of ρ up to the i-th step;
35:       let Φ_{pfx} be order constraint imposed by pfx;
36:       if ( (Φ_{CTPρ⁺} ∧ Φ_{pfx}) is unsatisfiable)
37:          s.backtrack ← ∅;
38:       else
39:          return;
40:    }
41: }
```

FIG. 3

```
21:   b=x;
      rec-branch-begin();
22:   if (b==0) {
23:     y=1;
24:     b=y+1;
25:     y=b;
        rec-var-WR-in-other-branch( {y} );
26:   } else {
27:     y=-1;
        rec-var-WR-in-other-branch( {y,b} );
28:   }
      rec-branch-end();
```

*FIG. 4(A)*

```
22':  if (b==0) {
23':    b=1;
24':    while(b++ < 100)
25':      y += b;
```

SYMBOLIC REDUCTION OF DYNAMIC EXECUTIONS OF CONCURRENT PROGRAMS

CROSS REFERENCE TO RELATED APPLICATIONS

This application claims the benefit of U.S. Provisional Patent Application Ser. No. 61/101,746 filed Oct. 1, 2008.

FIELD OF DISCLOSURE

This disclosure relates generally to the field of computer programs and more particularly to methods for verifying concurrent computer programs.

BACKGROUND OF DISCLOSURE

Dynamic model checking has been shown to advantageously provide the direct verification of concurrent programs written in contemporary programming languages such as C and Java, by systematically executing a program in its target environment under different thread schedules (interleavings). Since such techniques execute the program itself rather than a model, they do not produce bogus errors when verifying safety properties, such as local assertions.

For verifying terminating programs—unless context-bounding is imposed—these methods are also complete (i.e., do not miss any real error). However, explicitly enumerating thread interleavings is "expensive" since the number of interleavings may be very large.

Dynamic partial order reduction (DPOR) has been used in to "prune away" redundant thread interleaving. For each (Mazurkiewicz) trace equivalence class of interleavings, if a representative has been checked, the remaining ones are regarded as redundant. However, DPOR only removes redundant interleavings within each equivalence class, it does not help when an equivalence class itself is redundant, e.g., with respect to a correctness property. In such cases, a property specific reduction is required to prune away the redundant equivalence classes. Property specific reduction can be achieved by symbolic methods using an underlying satisfiability (SAT or SMT) solver. As used herein, SAT formula denotes a formula either in Boolean logic or in a quantifier-free first-order logic while SAT solver denotes a decision procedure of SAT formulas.

With symbolic methods, verification is often posed as a satisfiability problem such that the SAT formula is satisfiable if there exists an interleaving execution of the program that violates the property. The reduction happens inside the SAT solver through the addition of learned clauses derived by conflict analysis. However, a disadvantage of SAT-based symbolic analysis is that it does not scale well to the entire program, because the cost of checking all possible program executions is often too high.

SUMMARY OF DISCLOSURE

An advance is made in the art according to the principles of the present disclosure directed to a computer implemented method for the verification of concurrent software programs. According to an aspect of the present disclosure the concurrent software program is partitioned into subsets named concurrent trace programs (CTPs). Each of the CTPs is evaluated using a satisfiability-based (SAT) symbolic analysis. Advantageously, by applying the SAT analysis to individual CTPs in isolation—unexpectedly makes the symbolic analysis more scalable.

Of further advantage, methods according to the present disclosure exhibit an improved efficiency as contrasted with the prior art methods that consider each equivalence class—many of which may be redundant with respect to a given property under consideration.

Finally, the method according to the present disclosure employs the SAT-based analysis to endure that each dynamic execution produces a distinct CTP and to prune away redundant CTPs with respect to a given property.

BRIEF DESCRIPTION OF THE DRAWING

A more complete understanding of the disclosure may be realized by reference to the accompanying drawing in which.

DESCRIPTION OF EMBODIMENTS

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGs. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Unless otherwise explicitly specified herein, the drawings are not drawn to scale.

By way of some further background, the reader is directed to the following references: [1] S. Burckhardt, R. Alur, and M. Martin. CheckFence: checking consistency of concurrent data types on relaxed memory models. In *Programming Language Design and Implementation*, pages 12-21. ACM, 2007; [2] F. Chen and G. Rosu. Parametric and sliced causality. In *Computer Aided Verification*, pages 240-253. 2007; [3] E. M. Clarke, D. Kroening, and F. Lerda. A tool for checking ANSI-C programs. In *Tools and Algorithms for Construction and Analysis of Systems*, pages 168-176. Springer, 2004; [4] B. Cook, D. Kroening, and N. Sharygina. Symbolic model checking for asynchronous boolean programs. In *SPIN Workshop on Model Checking Software*, pages 75-90. Springer, 2005; [5] B. Dutertre and L. de Moura. A fast linear-arithmetic solver for dpll(t). In *Computer Aided Verification*, pages 81-94. Springer, 2006; [6] C. Flanagan and P. Godefroid. Dynamic partial-order reduction for model checking software. In *Principles of programming languages*, pages 110-121, 2005; [7] M. Ganai and A. Gupta. Efficient modeling of concurrent systems in BMC. In *SPIN Workshop on Model Checking Software*, pages 114-133. Springer, 2008; [8] P. Godefroid. Software model checking: The VeriSoft approach. *Formal Methods in System Design*, 26(2):77-101, 2005; [9] O. Grumberg, F. Lerda, O. Strichman, and M. Theobald. Proof-guided underapproximation-widening for multi-process systems. In *Principles of programming languages*, pages 122-131, 2005; [10] F. Ivančić, I. Shlyakhter, A. Gupta, M. K. Ganai, V. Kahlon, C. Wang, and Z. Yang. Model checking C program using F-Soft. In *International Conference on Computer Design*, pages 297-308, October 2005; [11] V. Kahlon, A. Gupta, and N. Sinha. Symbolic model checking of concurrent programs using partial orders and on-the-fly transactions. In *Computer Aided Verification*, pages 286-299. Springer, 2006; [12] V. Kahlon, C. Wang, and A. Gupta. Monotonic partial order reduction: An optimal symbolic partial order reduction technique. In *Computer Aided Verification*, pages 398-413, 2009; [13] S. Lahiri and S. Qadeer. Back to the future: revisiting precise program verification using SMT solvers. In *Principles of Programming Languages*, pages 171-182. ACM, 2008; [14] J. Lee, D. Padua, and S. Midkiff. Basic compiler algorithms for parallel programs. In *Principles and Practice of Parallel Programming*, pages 1-12, 1999; [15] A. W. Mazurkiewicz. Trace theory. In *Advances in Petri Nets*, pages 279-324. Springer, 1986; [16] M. Musuvathi and S. Qadeer. CHESS: Systematic stress testing of concurrent software. In *Logic-Based Program Synthesis and Transformation*, pages 15-16. Springer, 2006; [17] G. Necula, S. McPeak, S. Rahul, and W. Weimer. CIL: Intermediate language and tools for analysis and transformation of c programs. In *International Conference on Compiler Construction*, pages 213-228. Springer, 2002; [18] I. Rabinovitz and O. Grumberg. Bounded model checking of concurrent programs. In *Computer Aided Verification*, pages 82-97. Springer, 2005; [19] K. Sen, G. Rosu, and G. Agha. Detecting errors in multithreaded programs by generalized predictive analysis of executions. In *Formal Methods for Open Object-Based Distributed Systems*, pages 211-226. Springer, 2005; [20] J. P. M. Silva and K. A. Sakallah. Grasp—a new search algorithm for satisfiability. In *International Conference on Computer-Aided Design*, pages 220-227, November 1996; [21] C. Wang, Y. Yang, A. Gupta, and G. Gopalakrishnan. Dynamic model checking with property driven pruning to detect race conditions. In *Automated Technology for Verification and Analysis*. Springer, 2008; [22] C. Wang, Z. Yang, V. Kahlon, and A. Gupta. Peephole partial order reduction. In *Tools and Algorithms for Construction and Analysis of Systems*, pages 382-396. Springer, 2008; [23] Y. Yang, X. Chen, and G. Gopalakrishnan. Inspect: A Runtime Model Checker for Multithreaded C Programs. Technical Report UUCS-08-004, University of Utah, 2008; [24] Y. Yang, X. Chen, G. Gopalakrishnan, and C. Wang. Automatic discovery of transition symmetry in multithreaded programs using dynamic analysis. In *SPIN workshop on Software Model Checking*, 2009.

Concurrent Trace Programs

In order to fully appreciate methods implemented according to the present disclosure, it is necessary to introduce a simple but general concurrent language in addition to defining traces and concurrent trace programs.

Programs. A program in our language comprises of a set SV of shared variables and a finite set of threads $T_0, \ldots, T_k$. More particularly, we let Tid={0, 1, ..., k} be the set of thread indices and $T_0$ be the main thread. Each thread $T_i$ comprises of a set of control locations $Loc_i$, a set of local variables $LV_i$, and a set of operations. Each $Loc_i$ contains unique entry and exit locations $l_{entry}$, $l_{exit}$ of the thread, as well as two imaginary locations $\bot$, $\top$: thread $T_i$ is in $\bot$ before its creation and is in $\top$ after termination. We define operation $\chi$ as a triple (l, a, l'), where l, l'$\in Loc_i$ and a is an action label. Note that by definition, each operation $\chi$ belongs to only one thread. Let $V_i$=SV $\cup$ $LV_i$ be the set of variables accessible to thread $T_i$.

Each action label a in $T_i$ has one of the following forms:

guarded assignment (assume(c), asgn), where c is a condition over $V_i$, and asgn={lval:=exp} is a set of parallel assignments, where lval$\in V_i$ and exp is an expression over $V_i$. Intuitively, the assignments proceed iff condition c is true.

fork(j), where j$\in$ Tid and j≠i, starts the execution of child thread $T_j$.

join(j), where j$\in$ Tid and j≠i, waits for child thread $T_j$ to terminate.

assert(c), where c is a condition over $V_i$, asserts c.

While this language is simple, by defining expressions suitably and using source-to-source transformations, we can advantageously model all statements in multi-threaded C. We omit the details on modeling the C language constructs such as pointers and structures, since they are not directly related to concurrency.

The guarded assignment action (assume(c), asgn) may have the following variants: (1) when c=true, it can represent normal assignments; (2) when the assignment set is empty, assume(c) itself can represent the then-branch of an if(c)-else statement, while assume(¬c) can represent the else-branch; and (3) with both guard and assignments, it can represent an atomic check-and-set, which is the foundation of all kinds of synchronization primitives. In particular, we precisely capture the semantics of all synchronization primitives in the standard PThreads library.

For example, acquiring lock lk in thread $T_i$ is modeled as (assume(lk=0), {lk:=i}), where i is the thread id; and acquiring the counting semaphore se is modeled as (assume(se>0), {se:=se−1}) while actions fork and join represent thread creation and termination, respectively. In the PThreads library, they correspond to pthread_create and pthread_join. Action assert(c) specifies the correctness property, and it corresponds to the assertion function in the standard C library.

Execution Traces. We have defined the operation $\chi=(l_1, a, l_2)$, where $l_1, l_2 \in Loc_i$, as the instance of a statement in the i-th thread. This is needed because a statement in the textual representation of a multithreaded C program may be executed by multiple threads. Furthermore, since each operation $\chi$ may be executed more than once within a thread, e.g., when it is in a loop, we define event $t=(l_1^k, a, l_2^k)$, where $k \in N$, to denote the k-th instance of $\chi$ in an execution trace.

We define the semantics of a program using a labeled transition system. Accordingly, we Let $V=SV \cup \cup_i LV_i$ be the set of variables in the program. Let Val be a set of values for variables in V. Val contains a special symbol $\perp_{UT}$, denoting the uninitialized value. We also assume that when thread $T_i$ is in locations $\perp$ or $\top$, all local variables in $SV_i$ have the value $\perp_{UT}$.

A state of the program is a tuple $s=(\sigma_V, PC)$, where $\sigma_V : V \rightarrow Val$ assigns a value to each variable, and PC is a function mapping each thread id $i \in Tid$ to its current control location $l \in Loc_i$. For convenience, we may use s[v] and s[exp] to denote the values of v and exp in state s. Transitions have the form $$s \xrightarrow{t} s',$$

where $s=(\sigma_V, PC)$ and $s'=(\sigma'_V, PC')$ are states, and t is an event. Intuitively, the existence of such a transition means: the program state changes from s to s' when we execute t.

More formally, let $t=(l, a, l')$ be an event of thread $T_i$; there exists a transition $$s \xrightarrow{t} s'$$

iff PC(i)=l, PC'(i)=l', and one of the following conditions holds:
 a=(assume(c), asgn), s[c]=true; for each lval:=exp in asgn, s'[lval]=s[exp]; and states s, s' agree otherwise.
 a=fork(j), PC(j)=$\perp$, PC'(j)=$l_{entry}$, where $l_{entry} \in Loc_j$ is the entry of $T_j$; and states s, s' agree otherwise.
 a=join(j), PC(j)=$l_{exit}$, PC'(j)=$\top$, where $l_{exit} \in Loc_j$ is the exit of $T_j$; and states s, s' agree otherwise.

a=assert(c), s[c]=true; and states s, s' agree otherwise. Note that if s[c]=false, an error will be raised.

Based on the above semantics, we may define the execution traces.

Definition 1. Let P be a program and $s_0$ be the initial state. Let $\rho=t_1 \ldots t_n$ be an event sequence. The tuple $(s_0, \rho)$ defines an execution trace iff there is a state sequence $s_0 \ldots s_n$ such that, there exist transitions $$s_{i-1} \xrightarrow{t_i} s_i$$

for i=1, ..., n.

By definition all events in an execution trace are unique. In the sequel, we shall assume that program P has a unique initial state; therefore, we may use $\rho$ instead of $(s_0, \rho)$ when referring to an execution trace.

Figure 1:
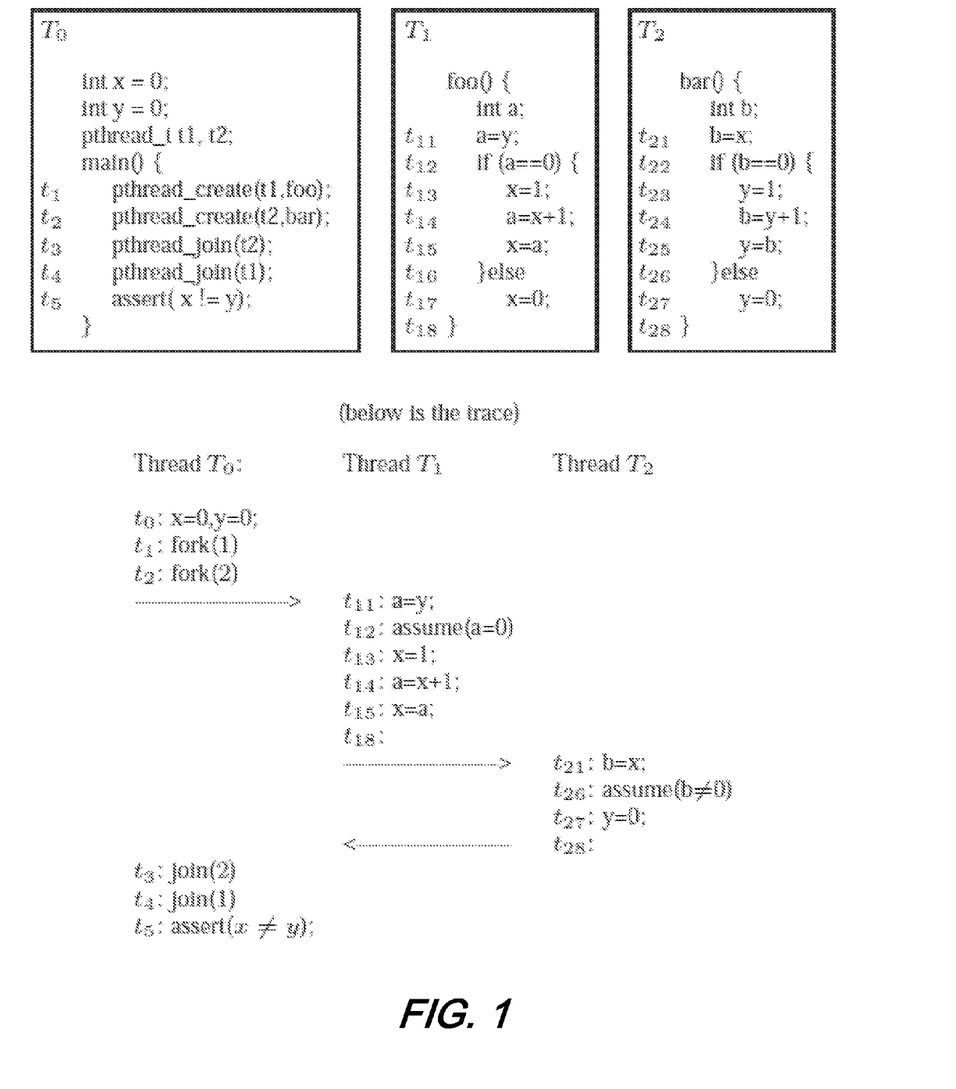
FIG. 1 is an example of a multithreaded software program written in the C programming language showing an execution trace.

Example. FIG. 1 shows an example of a multithreaded C program with two shared variables x and y (which can be translated into our language). The main thread $T_0$ creates $T_1$ and $T_2$ (which in turn start running foo and bar, respectively), waits for them to terminate, and asserts (x≠y). From the initial state x=y=0, there exists an execution trace $\rho=t_1 t_2 \{t_{11}-t_{15}\} t_{18} t_{21} t_{26} t_{27} t_{28} \{t_3-t_5\}$. The events in $\rho$ are shown in FIG. 1, from top to bottom, in their execution order.

As used therein, pthread_create and pthread_join are routines in PThreads library, directly corresponding to fork/join in our model. Due to fork/join, the thread routines foo and bar run concurrently with each other. The assertion at $t_5$ defines the correctness property, which holds in some, but not in all, execution traces of the program. In particular, the assertion holds in $\rho$.

Concurrent Trace Programs. Let $\rho$ be an execution trace and T={t|t is an event in $\rho$}. We view $\rho$ as a total order of the elements in T.

Definition 2. The concurrent trace program $CTP_\rho$ is a partially ordered set (T, $\sqsubseteq$), where T={t|t is an event in $\rho$}, and $\sqsubseteq$ is the partial order such that, for two arbitrary events $t_i, t_j \in T$, we have $t_i \sqsubseteq t_j$ iff i=j, or one of the following conditions holds:
1. $tid(t_i)=tid(t_j)$ and i<j in $\rho$,
2. $tid(t_i) \neq tid(t_j)$ and there exist $t_k, t_l \in T$ such that $t_i \sqsubseteq t_k, t_l \sqsubseteq t_j$, and
  either $t_k$ has action fork(tid($t_l$)),
  or $t_l$ has action join(tid($t_k$)).

Intuitively, the first condition captures the constraint that events in the same thread are ordered by their execution order in $\rho$. The second condition says that events of a child thread happen after fork, but before join of the parent thread. Since the partial order is constructed from $\rho$, which represents a concrete program execution, fork of a thread always comes before its join.

Not all linearizations of $CTP_\rho$ may correspond to execution traces of the program P. Let $\rho'=t'_1 \ldots t'_n$ be a linearization (total order) of $CTP_\rho$; we say that p' is a feasible linearization iff p' is an execution trace. By definition, all feasible linearizations of $CTP_\rho$ model the real behavior of program P. Therefore, any error found in $CTP_\rho$ is guaranteed to be a real error.

According to the definition, if $\rho, \rho'$ are execution traces of the same program and they have the same set of events, then $CTP_\rho$ and $CTP_{\rho'}$ are the same. Therefore, we can regard two traces $\rho, \rho'$ as CTP-equivalent iff they have the same set of events. Now we compare CTP-equivalence with the popular Mazurkiewicz-trace equivalence. In the POR literature, two events $t_1, t_2$ are independent if (1) executing one does not enable/disable another, and (2) they do not have data conflict, i.e., there does not exist a state s where both $t_1$, $t_2$ are enabled, access the same variable, and at least one of them is a write. Two traces are (Mazurkiewicz) equivalent iff one trace can be transformed into another by repeatedly swapping adjacent independent events. Therefore, two (Mazurkiewicz) equivalent traces have the same set of events.

Theorem 1. Let $\rho_1$, $\rho_2$ be two execution traces of program P. If $\rho_1$, $\rho_2$ are (Mazurkiewicz) equivalent, then $CTP_{\rho 1} = CTP_{\rho 2}$.

This theorem has significant implications. Recall that classic POR relies on trace equivalence. For each (Mazurkiewicz) trace equivalence class, if a representative interleaving has been checked, the remaining interleavings are regarded as redundant and therefore are pruned away. Theorem 1 shows that, in order to apply POR, we need to consider no more than the interleavings within a CTP, because the CTP always contains (Mazurkiewicz) equivalence classes in their entirety. This allows us to take full benefit of the POR reduction, while focusing on smaller partitions (CTP) rather than whole programs. Advantageously, the overhead of symbolic encoding of POR is also reduced.

Figure 2:
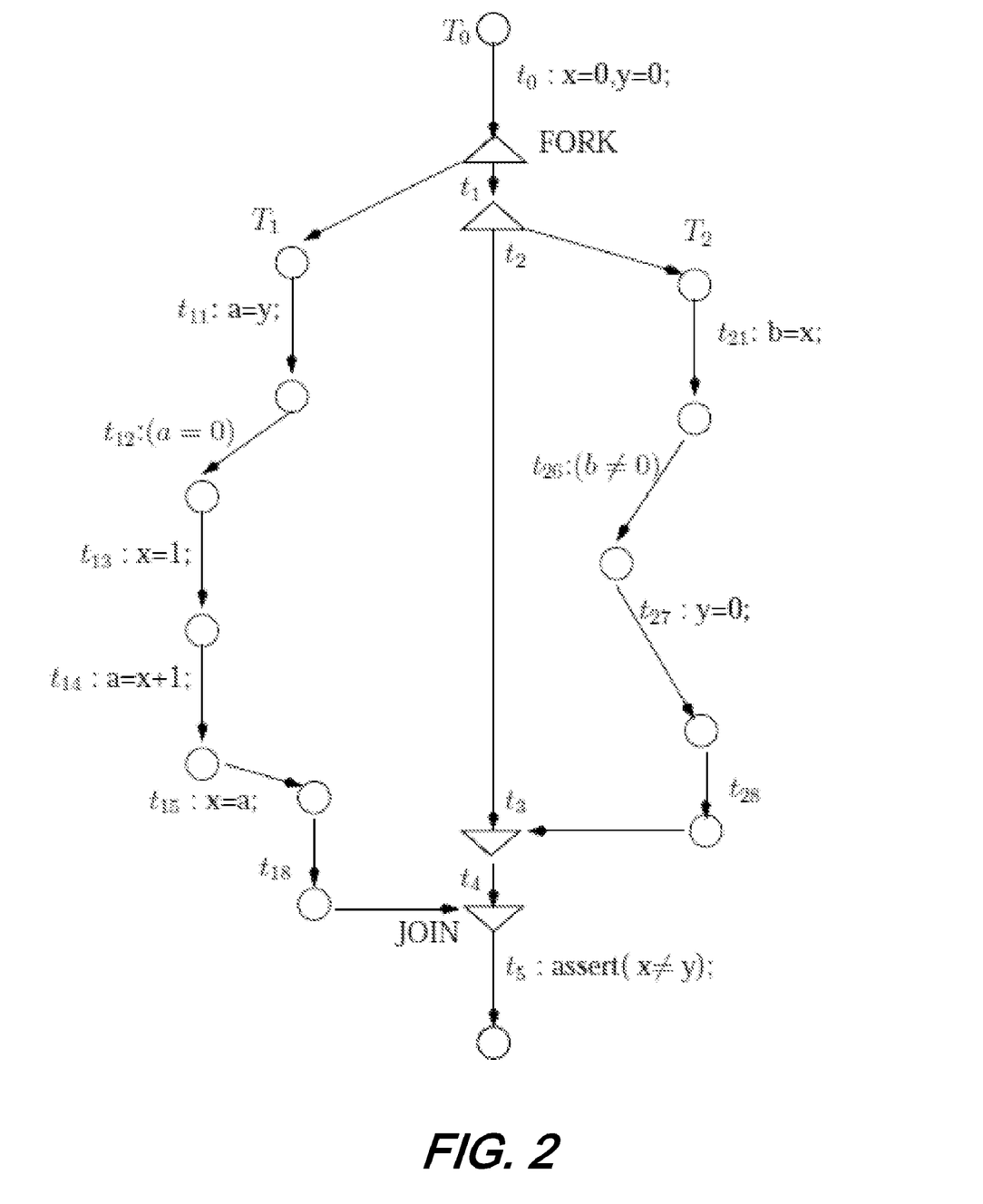
FIG. 2 is a concurrent trace program for $\rho$ in FIG. 1.

Example. FIG. 2 illustrates the CTP derived from the trace $\rho$ in FIG. 1. In the graph representation, nodes denote control locations and edges denote events. We use $\Delta$ to indicate the start of fork (denoted $n_{fork}$) and $\nabla$ to indicate the end of join (denoted $n_{join}$). According to their semantics, fork results in simultaneously executing all outgoing edges of $n_{fork}$, while join results in simultaneously executing all incoming edges of $n_{join}$. The three vertical paths in this figure, from left to right, represent the control flow paths in $T_1$, $T_0$, $T_2$, respectively. Since $CTP_\rho$ defines a partial order, interleavings different from $\rho$ are also allowed. For instance, although $t_{15}$ appeared before $t_{21}$ in $\rho$, inside $CTP_\rho$, it is allowed to be executed after $t_{21}$. However, not all linearizations of $CTP_\rho$ are feasible.

Consider the trace $\rho''=t_1 t_2 t_{21} t_{26} t_{27} t_{28} \{t_{11}-t_{15}\} t_{18} \{t_3-t_5\}$; it is not a feasible linearization because $t_{26}$:assume (b≠0) is violated. In contrast, the trace $\rho'''=t_1 t_2 \{t_{11}-t_{14}\} t_{21} t_{26} t_{27} t_{28} t_{15} t_{18} \{t_3-t_5\}$ is a feasible linearization. Later in this disclosure a SAT-based encoding which explores only feasible linearizations of $CTP_\rho$ will be discussed. Finally, note that $\rho'''$ and $\rho$ are not Mazurkiewicz equivalent (and yet they are CTP-equivalent).

Enumerative Search

In our framework according to the present disclosure, the execution traces of a program are produced by an enumerative algorithm that systematically explores the concurrent program. For each execution trace $\rho$, we derive $CTP_\rho$ and symbolically check all its feasible linearizations for property violations. If we find a bug in $CTP_\rho$, it is guaranteed to be a real bug in the program. If we do not find any bug in $CTP_\rho$, the enumerative algorithm moves on to the next execution trace $\rho'$.

To understand the framework, we first review the baseline enumeration algorithm, and then highlight and motivate our modifications.

Baseline Search Algorithm. The baseline enumerative algorithm is similar to dynamic model checking. The algorithm is implemented in a so-called scheduler process, running concurrently with the program under verification (a separate process). Our scheduler controls the execution order of the program's statements and records the execution trace in a stack S. It is important to note that our scheduler records only the event sequence $t_1 \ldots t_i$, not the concrete states represented as variable valuations—due to the large state space, such a stateful approach often runs into scalability problems in practical settings. We adopt the stateless model checking approach, where each state $s_i \in S$ is represented implicitly by the event sequence $t_1 \ldots t_i$ that leads to state $s_i$ (from the initial state $s_0$).

During the enumerative search, in each $s \in S$, we maintain the following data structures:

The set s.enabled consists of all events that can be executed from s; that is, it contains t iff $$s \xrightarrow{t} s'$$

exists for some s'.

The set s.done $\subseteq$ s.enabled consists of all the events that have been executed from s in some previous runs.

The set s.backtrack $\subseteq$ Tid consists of the enabled threads (ids) that remains to be explored from s in future runs.

Figure 3:
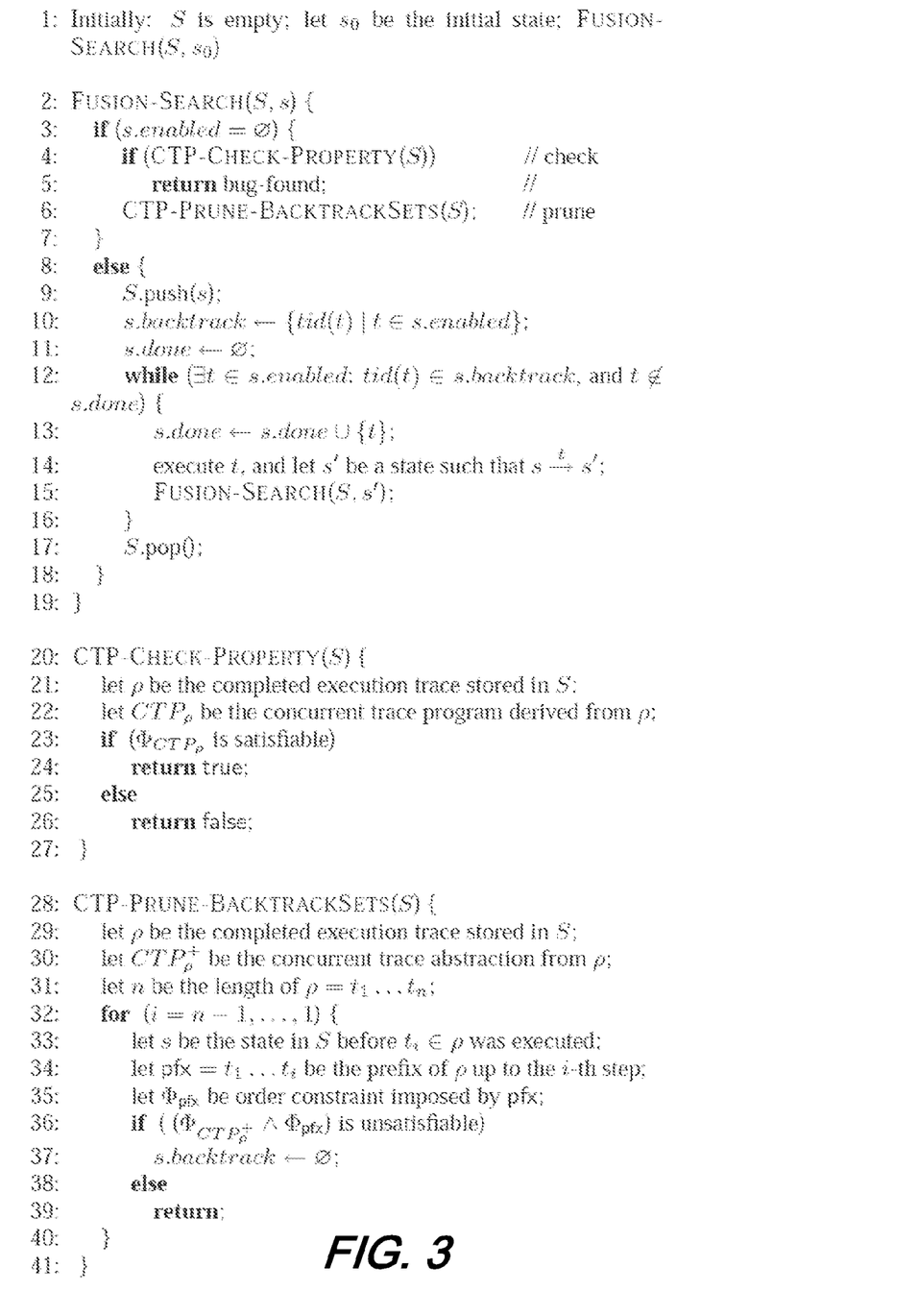
FIG. 3 is a pseudocode listing of a symbolic pruning method according to an aspect of the present disclosure.

The pseudo code of our inventive method is shown in FIG. 3. For now, we will ignore lines 4-6 and the subroutines in lines 20-41 for. As may be observed, procedure FUSION-SEARCH starts from state $s_0$ and keeps executing the program till it terminates, where termination is signaled by s.enabled=∅. Each execution step is a (recursive) call to FUSION-SEARCH. At each step, a previously unexplored enabled event t is picked from s.enabled such that tid(t) is also in the backtrack set s.backtrack.

Once the termination state is reached (line 3), a complete execution trace $\rho$ can be derived from the search stack S. To move on to the next trace, FUSION-SEARCH returns to a previous step, picks another enabled event t such that tid(t)∈s.backtrack, and continues the execution. The algorithm stops when FUSION-SEARCH (S, $s_0$) returns.

The set s.backtrack is crucially important in affecting the search performance. In the baseline algorithm, since s.backtrack contains all threads that are enabled at s, when the algorithm stops, all possible interleavings of the program have been explored. There is a scalability problem in the baseline algorithm, since the number of interleavings of a nontrivial concurrent program is often very large—as can be appreciated by those skilled in the art.

Goal of Pruning. One goal of our symbolic analysis is to solve the aforementioned interleaving explosion problem. Our analysis comprises two phases, i.e., check and prune, corresponding to lines 4-6 of the pseudo code in FIG. 3. Recall that once the algorithm reaches line 3, the particular run of the program has completed, and the execution trace $\rho$ can be retrieved from the search stack S.

First, we call CTP-CHECK-PROPERTY to derive $CTP_\rho$ and check its feasible linearizations for property violations. If we find an error in $CTP_\rho$, it is a real error and the algorithm stops. If we cannot find any error in $CTP_\rho$, we call CTP-PRUNE-BACKTRACKSETS to prune the future search space. Since the enumerative search is conducted in a DFS order, pruning can be realized by removing some backtrack points (in s.backtrack) that correspond to the redundant CTPs.

In CTP-PRUNE-BACKTRACKSETS, there are two challenging problems that need to be solved. First, how to prune the backtrack points so that, among the produced execution traces $\rho_1, \rho_2, \ldots$, we have $CTP_{\rho_i} \neq CTP_{\rho_j}$ for all i≠j. It ensures that CTP-CHECK-PROPERTY always works on distinct CTPs to avoid duplicated work. Second, how to prune the backtrack points so that when $CTP_{\rho_i} \neq CTP_{\rho_j}$, if the current $CTP_{\rho_i}$ being error-free implies that the future $CTP_{\rho_j}$ is error-free as well, the redundant trace $\rho_j$ will not be generated in the first place.

At this point, it is important to note that we do not (intend to) solve these two problems precisely, i.e. some CTPs we check may be redundant. The main idea of our pruning effort is to use a fast and conservative analysis, which can weed out many, but perhaps not all, redundant CTPs. In the next two sections, we shall present symbolic algorithms for checking $CTP_\rho$ and for identifying redundant backtrack points.

Symbolically Checking CTPs

Given $CTP_\rho$, we symbolically check all its feasible linearizations for property violations. We express this verification problem as a SAT formula $\Phi_{CTP_\rho}$ such that it is satisfiable iff a feasible linearization violates the correctness property.

Although our symbolic encoding is applicable to any loop-free concurrent program, in this section we shall present the algorithm by tailoring it to CTPs only. In the next section, we will extend it to handle the more general case.

Constructing the CSSA Form. Our SAT encoding is based on transforming a loop-free program (e.g., a CTP) into a concurrent static single assignment (CSSA) form. This CSSA form has the property that each variable is defined exactly once. A definition of variable v is an event that modifies v, and a use is an event when v appears in an expression (condition or right-hand-side of an assignment).

The transformation comprises: (1) renaming variables that have more than one definition, (2) adding φ-functions at the merging points of if-else statements to represent the confluence of multiple definitions in thread-local branches, and (3) adding π-functions before shared variable uses to represent the confluence of multiple definitions in different threads. While φ-functions exist in standard SSA form, π-functions are unique to concurrent programs. Since each thread in a CTP has a single thread-local path without branches, φ-functions are not needed in a $CTP^1$.

[1] We will use φ-functions in $CTP_\rho^+$.

Definition 3. A φ-function, for a local variable v at the merging node of multiple branches of the same thread, has the form $\phi(v_1, \ldots, v_k)$, where each $v_i$ ($1 \leq i \leq k$) is the definition of v in the i-th incoming branch.

Definition 4. A π-function, for a shared variable v at the node before its use, has the form $\pi(v_1, \ldots, v_k)$, where each $v_i$ ($1 \leq i \leq k$) is either the most recent definition in the same thread (as the use), or a definition in another concurrent thread.

We construct the CSSA form of a program as follows:
1. Create unique names for local variables in their definitions.
2. Create unique names for shared variables in their definitions.
3. Add a φ-function for each local variable v at the thread-local merging node of two branches, create a unique name w, and add definition $w \leftarrow \phi(v_1, \ldots, v_k)$.
4. For each use of a local variable, replace the use with the most recent (unique) definition.
5. For each use of a shared variable v, the most recent definition may not be unique (depending on the interleaving).
   Add a π-function immediately before the use, create a unique name w, and add definition $w \leftarrow \pi(v_1, \ldots, v_k)$;
   Replace the use with the newly defined w.

Example. The CSSA form of the CTP in FIG. 2 is shown in EXAMPLE 1. With reference to that EXAMPLE 1 it may be observed that we create $w_1 \leftarrow \pi(y_0, y_1)$ at $t_{11}$ to denote the most recent definition of the shared variable y. This may be either $y_0$ defined in $t_0$, or $y_1$ defined in $t_{27}$. We create the other w-variables in a similar way. Note that the π-functions for $w_3$, $w_4$, $w_5$ have only one parameter because their most recent definitions can be statically determined. In particular, for x at $t_5$, we can statically determine that definitions $x_0$, $x_1$ must happen before $x_2$ due to the semantics of fork/join—therefore they cannot be the most recent definition.

From CSSA to $\Phi_{CTP_\rho}$. The CSSA form described by others was designed for compiler optimizations where φ, π functions are treated as nondeterministic choices. The interpretation is too conservative for verification. We interpret them precisely in our SAT encoding described below.

Execution time. We start by assigning each event t a fresh integer variable O(t) denoting its execution time. We use HB(t, t') to express the constraint that t is executed before t'. In the SAT/SMT formula, HB(t, t') is implemented as a difference logic constraint: $O(t) < O(t')$, or simply $O(t) - O(t') \leq -1$.

Path conditions. For all events t in CTP, we define the path condition g(t) such that t is executed iff g(t) is true. Consider the graph representation of a CTP (e.g., FIG. 2); the predecessor of an event t is the edge immediately preceding t in the graph. We define the path condition as follows:

If t is the first event in the CTP (at the entry of main thread), let g(t):=true.

If t is a join, and $t_1, \ldots, t_k$ are the predecessors of t, let $g(t) = \bigwedge_{i=1}^{k} g(t_i)$.

Otherwise, let $t_1, \ldots, t_k$ be the predecessors of t, and $g_{in} := \bigwedge_{i=1}^{k} g(t_i)$: if t has the action assume(c), then $g(t) := c \wedge g_{in}$; otherwise, $g(t) := g_{in}$.

We construct $\Phi_{CTP}$ as follows ($\Phi_{CTP}$=true initially)
1. Program Order: For each event $t \in CTP$,
   if t is the first event in the CTP, do nothing;
   otherwise, for each predecessor t' of t in the CTP, let $\Phi_{CTP} := \Phi_{CTP} \wedge HB(t', t)$.
This rule captures the program order specified in Definition 2.
2. Actions: For each event $t \in CTP$,
   if t has lval:=exp, let $\Phi_{CTP} := \Phi_{CTP} \wedge (lval = exp)$;
   if t has assert(c), let $\Phi_{CTP} := \Phi_{CTP} \wedge \neg (g(t) \rightarrow c)$;
3. π-Functions: For each $w \leftarrow \pi(v_1, \ldots, v_k)$, defined in t, let $t_i$ be the event that defines $v_i$, let $$\Phi_{CTP_\rho} := \Phi_{CTP_\rho} \wedge \bigvee_{i=1}^{k} (w = v_i) \wedge g(t_i) \wedge HB(t_i, t) \wedge \bigwedge_{j=1, j \neq i}^{k} (HB(t_j, t_i) \vee HB(t, t_j))$$

Intuitively, the π-function evaluates to $v_i$ iff it chooses the i-th definition in the π-set. Having chosen $v_i$, all other definitions $j \neq i$ must occur either before $t_i$, or after this use of $v_i$ in t.
4. π-Functions: For each $w \leftarrow \phi(v_1, \ldots, v_k)$, defined in t, let $t_i$ be the predecessor of t such that $t_i$ is in the branch that defines $v_i$.

$$\Phi_{CTP_\rho} := \Phi_{CTP_\rho} \wedge \bigvee_{i=1}^{k} (\varphi = v_i) \wedge g(t_i)$$

That is, the φ-function evaluates to $v_i$ iff the branch of $t_i$ is executed. If no branching exists in any thread, as is the case for $CTP_\rho$, this rule is not needed.

Theorem 2. Formula $\Phi_{CTP_\rho}$ is satisfiable iff there exists a feasible linearization of $CTP_\rho$ violating the correctness property.

The symbolic encoding of formula $\Phi_{CTP_\rho}$ directly follows the semantics of CTP as defined in Section 2. Therefore, the theorem holds by construction. Note that solutions (variable assignments) to a $\Phi_{CTP}$ correspond to linearizations of CTP.

It is important to point out that the encoding allows interleavings between threads to take place, subject only to the HB-constraints added in rules 1 and 3. Since CTP has a finite size, the formula $\Phi_{CTP}$ can be expressed in a quantifier-free first-order logic. In our implementation, the formula is decided by an off-the-shelf Satisfiability Modulo Theory (SMT) solver.

Pruning Redundant CTPs

The pruning problem presented earlier can be formulated into a SAT problem similar to $\Phi_{CTP_\rho}$. However, pruning requires an over-approximation of the behavior of the program, whereas $CTP_\rho$ is an underapproximation. A detailed explanation is given as follows.

Let $\rho=t_1 \ldots t_n$ be the current trace and $pfx=t_1 \ldots t_i$, where $1 \leq i < n$ be a prefix of $\rho$. Let W(pfx) be the set of traces $\{\rho'\}$ such that pfx matches a prefix of $\rho'$. Assume that executing pfx leads to state s. The pruning problem, i.e., whether s.backtrack can be pruned away, is deciding whether the correctness property holds on all traces in W(pfx). If the answer is yes, we do not need to generate these traces. However, $CTP_\rho$ may not capture all traces in W(pfx). Consider the CTP in FIG. 2 as an example: assume that $pfx=t_0 t_1 t_2 t_{21}$; continuing pfx by executing $T_2$ leads to the execution of $t_{22}$, which is not captured in $CTP_\rho$.

Therefore, we need to derive from $\rho$ an concurrent trace abstraction (CTA) which models all the events in $\rho$, and also (conservatively) models the untaken branches in all threads.

Concurrent Trace Abstraction (CTA). To model both branches in an if (c)-else statement, we add a phantom edge for the untaken branch guarded by ($\neg$ c). A precise modeling of the code in the untaken branch is undesirable due to scalability concerns. Instead, we consider appropriate abstractions depending on the correctness properties for pruning purposes[2].

[2] For instance, for detecting data races, a practical abstraction uses a may-set of shared variables that are accessed in the branch and the corresponding must-set of locks protecting the accesses.

For checking local assertions, a naive and yet correct abstraction is that the unobserved code may assign all variables to arbitrary values. That is, the phantom edge is labeled with guard ($\neg$ c) and the set $\{v \leftarrow * | v \in V\}$ of assignments, where V is the set of all program variables. The set of assignments may set any variable to an arbitrary value, and therefore can over-approximate any statement in the program. More formally, any state transition $$s \xrightarrow{t} s'$$

can be simulated $$s \xrightarrow{\{v \leftarrow * | v \in V\}} s'.$$

However, this abstraction is too coarse to be practically useful. We improve over the naive approach by using a conservative static analysis of the program, conducted a priori, to identify, for each unobserved branch, the set $WV \subseteq V$ of write-variables (variables that may be modified). In this new abstraction, the phantom edge assigns the WV-variables to arbitrary values. If an assertion is embedded in the untaken branch, we consider that it may fail and therefore add a special variable called assert_fail to WV.

Merging point. For each thread $T_j$ in a structured program, we assume the existence of a partial function $M: Loc_j \rightarrow Loc_j$ such that, for each event $t=(l, assume(c), l')$, there is $M(l)=l''$ which, intuitively, is the merging point of the two branches in if (c)-else. In control flow analysis literature, such merging points are called immediate post-dominators. More formally, l" strictly post-dominates l in a graph iff l≠l" and all paths from l to the exit point goes through l". And l" is the immediate post-dominator of l iff it is the closest strict post-dominator of l.

Figure 4A:
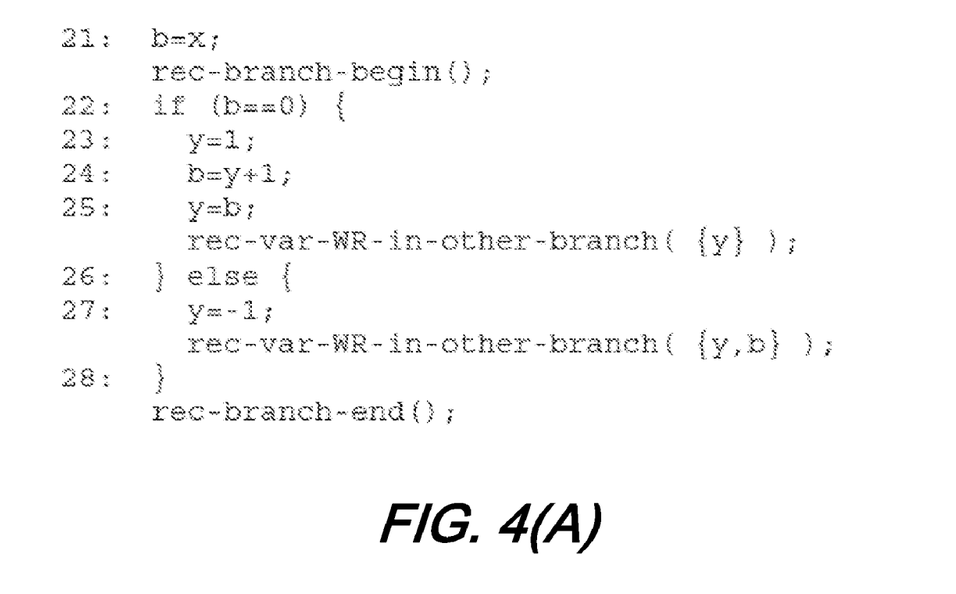
FIG. 4(A) is a program excerpt showing the instrumentation of an if-else statement.
Figure 4B:
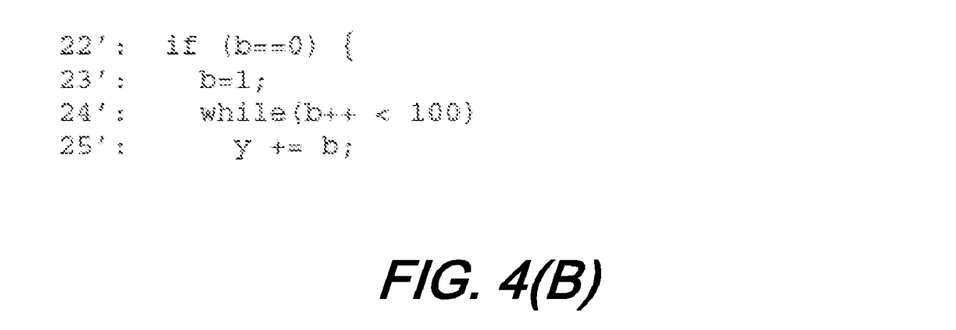
FIG. 4(B) is a program excerpt demonstrating the over approximation of FIG. 4(A)

In our implementation, we instrument all branching statements of a C program to make available at runtime the merging points and write-variables of untaken branches (computed a priori). This code instrumentation is illustrated in FIG. 4(A). First, we insert recording routines to signal the start and end of every branch—they mark the branch heads and their immediate post-dominators. Second, in both branches of if-else statement, we insert rec-var-WR-in-other-branch (WV), where WV is the set of write-variables in the other branch.

In this example, when the else-branch is executed, the recording routine will tell us that WV={y, b} in the untaken if-branch; similarly, when the if-branch is executed, we will know that WV={y} in the else-branch.

Phantom action label. For t=(l, assume(c), l') at a branch head in $\rho$, we define a phantom action label (assume($\neg$ c), $\{v \leftarrow * | v \in WV\}$), where $\neg$ c is the condition and WV is the set of write-variables of the untaken branch. Now we define the concurrent trace abstraction.

Definition 5. The concurrent trace abstraction (CTA), denoted $CTP_\rho^+$, is obtained by taking $CTP_\rho$ and adding a phantom edge $t_{ph}=(l, a, l'')$ for each untaken conditional branch, where l"=M(l) and a is the phantom action label.

Figure 5:
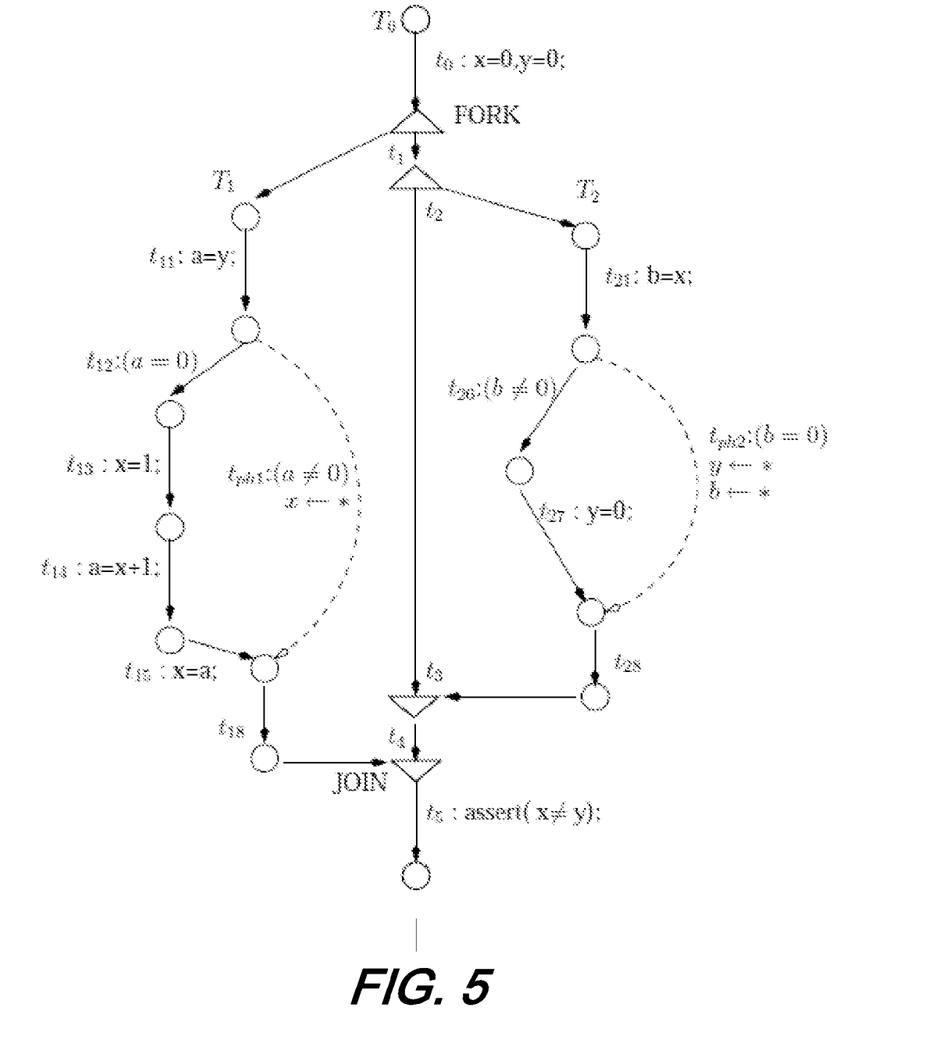
FIG. 5 is a concurrent trace program abstraction.

FIG. 5 shows the $CTP_\rho^+$ for the trace $\rho$ in FIG. 2. Here solid edges denote events in $\rho$, and dotted edges denote phantom edges. In this graph, there is one phantom edge in each thread. In particular, $t_{ph2}$ models the untaken branch $t_{22}$-$t_{25}$; and its phantom action label is $a_{ph2}=(assume(b=0), \{y \leftarrow *, b \leftarrow *\})$.

To understand why $t_{ph2}$ is an over-approximation of the untaken branch, consider replacing $t_{22}$-$t_{25}$ in FIG. 4 with $t_{22'}$-$t_{25'}$ below: since the set of write-variables remains the same, the CTA remains the same.

Recall that no two events in $\rho$ are the same. Consequently, the graph representation of CTA is always acyclic. Suppose that the entire code in FIG. 4 is embedded in a loop, then each time the loop body is executed, a new sequence of non-phantom edges $t'_{26} t'_{27}$ will occur after $t_{26} t_{27}$ (assuming the else-branch is taken), together with a new phantom edge $t'_{ph2}$.

Semantics of Phantom Edges. The semantics of a phantom edge is different from executing a non-phantom edge. Let $t_{ph}=(l, a_{ph}, l'')$ be the phantom edge, where $a_{ph}=(assume(\neg c), \{v \leftarrow * | v \in WV\})$. The effect of executing $t_{ph}$ is captured by the following regular expression:

$$assume(\neg c)\{v \leftarrow * | v \in WV\}*$$

That is, when condition $\neg$ c is true at l, the assignments may be executed for an arbitrary but finite number of times, before the control goes to l".

Using the semantics defined above, one can prove that the phantom edge $t_{ph}$ overapproximates the untaken branch guarded by $\neg$ c: all possible event sequences of the untaken branch are included in the above regular expression. The proof is sketched as follows: First, any event t of the untaken branch can be overapproximated by executing $\{v \leftarrow * | v \in WV\}$ once. Second, any finite event sequence of the untaken branch can be overapproximated by $\{v \leftarrow * | v \in WV\}*$.

For a concrete example, refer to FIG. 4(A). Any of the events $t_{23}$-$t_{25}$ or $t_{23'}$-$t_{25'}$ can be overapproximated by the phantom edge $t_{ph2}$:assume(b=0) $\{y \leftarrow *, b \leftarrow *\}$. Consequently, the representation of each thread in $CTP_\rho^+$ overapproximate the behavior of the thread in program P. This leads to the following observation.

Observation 1. The concurrent trace abstraction $CTP_\rho^+$ overapproximates the behavior of program P. That is, if $\rho'$ is an execution trace of P, then $\rho'$ is a feasible linearization of $CTP_\rho^+$.

Bounded Semantics. The phantom edge also has bounded semantics when it is restricted to a particular $CTP_\rho^+$. The reason is that, for a phantom assignment $v \leftarrow *$ (where $v \in WV$) to have any impact, the value defined for v needs to be used by other edges in $CTP_\rho^+$. Only non-phantom edges can use a variable—when the variable appears in conditions or the right-hand side of assignments. (The guard of a phantom edge does not count because it uses the same versions of variables as its non-phantom counterpart.)

Since $CTP_\rho^+$ has a fixed number of non-phantom edges, the aforementioned regular expression for is reduced as follows:

For each edge t that uses variable $v \in WV$, create a fresh copy $v_t$ as part of the CSSA construction. Let $WV_{cssa}$ be the set of all these fresh variables.

The set $\{v \leftarrow * | v \in WV\}$ is reduced to $\{v_t \leftarrow * | v_t \in WV_{cssa}\}$, where the size of $WV_{cssa}$ is fixed.

The effect of executing $t_{ph}$ is modeled by executing each individual assignment $v_t \leftarrow *$ (where $v_t \in WV_{cssa}$) exactly once, but in all possible orders.

Symbolically Encoding $\Phi_{CTP_\rho^+}$. The symbolic encoding for CTA closely resembles the encoding shown previously. Below we highlight only the modifications.

Figure 6:
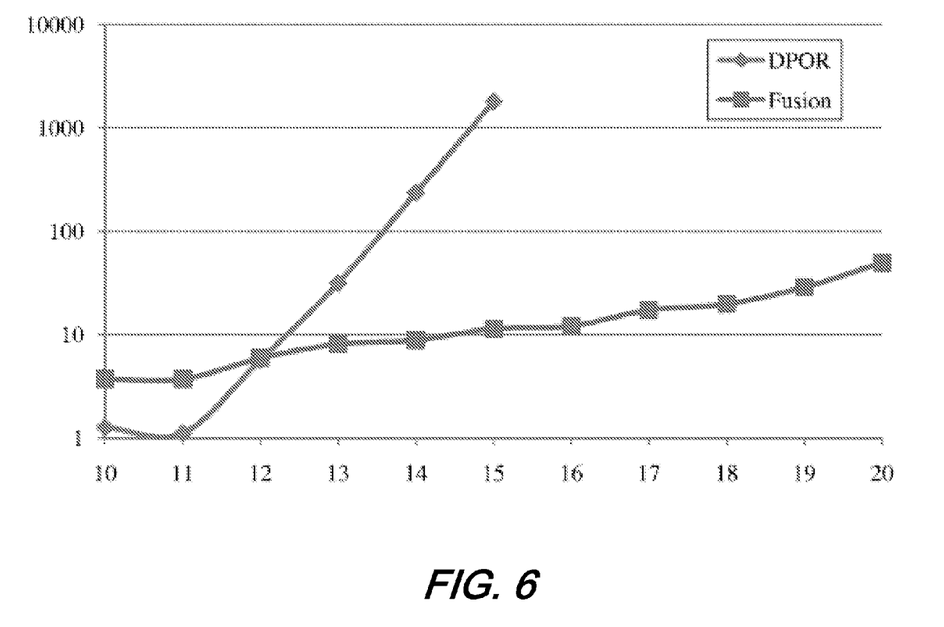
FIG. 6 is graph showing experimental results on the examples.

Adding φ-functions. Due to phantom edges, a thread in CTA may have multiple control paths. Therefore, φ-functions are needed when we construct the CSSA form. Shown earlier were the rules for adding and encoding φ-functions. As an example, the CSSA of the CTA in may be modified as shown in FIG. 6.

We add $\phi(a_1, a_2)$ and $\phi(b_1, b_2)$ at $t_{18}$ and $t_{28}$, to denote the most recent definitions of a and b. In $t_{ph2}$, variable y has two fresh copies because the definition is used in $t_{11}$ and $t_5$ (not because there are actually two definitions in the untaken branch $t_{23}$-$t_{25}$). Similarly, $t_{ph1}$ defines two copies of x since both $t_{21}$ and $t_5$ use it.

Encoding Phantom Edges. Let $\{v_t \leftarrow * | v_t \in WV_{cssa}\}$ be the set of assignments in the phantom edge $t_{ph}$. We create an execution time variable, denoted $O_t(t_{ph})$, for each assignment $v_t \leftarrow *$.

Program Order: In Rule 1 shown earlier, we added constraints to ensure that assignments in the phantom edge must happen after the predecessor edge t', and before the successor edge t''. That is, $$HB(t', t_{ph}) := \bigotimes_{\forall t \cdot v_t \in WV_{cssa}} O(t') < O_t(t_{ph})$$

$$HB(t_{ph}, t'') := \bigotimes_{\forall t \cdot v_t \in WV_{cssa}} O_t(t_{ph}) < O(t'')$$

π-Functions: In Rule 3 shown earlier, when encoding $w \leftarrow \pi(v_1, \ldots, v_k)$, if $v_i$ ($1 \leq i \leq k$) is defined by phantom edge $t_{ph}$ and is used by edge t, we define $O_t(t_{ph})$ as the execution time of assignment $v_t \leftarrow *$. The HB-constraints are as follows:

$$HB(t_{ph}, t) := O_t(t_{ph}) < O(t)$$

$$HB(t_j, t_{ph}) := O(t_j) < O_t(t_{ph})$$

Note that there is no need to encode the phantom assignments because (v=*) always equals true. Furthermore, in our encoding, phantom assignments from the same $t_{ph}$ are not ordered with respect to each other; all possible linearizations of them are allowed, in order to conservatively model behavior of the untaken branch.

Our encoding follows the bounded semantics of phantom edges defined in the previous subsection. Consequently, by Observation 1, formula $\Phi_{CTP_\rho^+}$ captures all possible execution traces of the program P (precisely for some and conservatively for others). We again use symbolic analysis to check for property violations in $CTP_\rho^+$. In this case, solutions to the SAT formula corresponds to linearizations of the CTA. If the formula is unsatisfiable, all linearizations of the CTA are error-free, since the CTA is an over-approximation. This implies that the entire program is proved to be error-free. In practice, it is rare that $CTP_\rho^+$ would be error-free by itself, however, when its linearizations are constrained to prefixes of ρ, the search subspace is more likely to be error-free. We exploit this to provide pruning in our enumerative search.

Using $CTP_\rho^+$ for Pruning. The pseudo code of the pruning algorithm is presented in FIG. 3, which starts from the last step of the current trace ρ, and for each i=n−1, . . . , 1, analyzes the prefix pfx of ρ up to the i-th step. For each pfx, it builds formula $\Phi_{pfx}$, which constrains the first i steps to be the same as pfx. Formula $\Phi_{pfx}$ is constructed as follows: First, we initialize $\Phi_{pfx}$:=true for the first event in pfx. For each remaining event $t \in \rho$, If t is in pfx and t' immediately precedes t in pfx, let $\Phi_{pfx} := \Phi_{pfx} \wedge HB(t', t)$;

If $t \notin$ pfx, and t' is the last event in pfx, let $\Phi_{pfx} := \Phi_{pfx} \wedge HB(t', t)$;

Theorem 3. Let $s_i$ be the program state after executing pfx. If formula $(\Phi_{CTP_\rho^+} \wedge \Phi_{pfx})$ is unsatisfiable, the backtrack points in $s_i$.backtrack can be removed.

The theorem follows from the construction of $\Phi_{CTP_\rho^+}$ and $\Phi_{pfx}$, the conjunction of which captures all the buggy execution traces of W(pfx). Recall that W(pfx), defined earlier, comprises all program traces sharing the same prefix pfx. Therefore, if formula $(\Phi_{CTP_\rho^+} \wedge \Phi_{pfx})$ is unsatisfiable, then the property holds on all execution traces in W(pfx) (the reverse need not be true).

Example. Consider the running example, and regard ρ in FIG. 2 as the current trace in the enumerative search. Without our symbolic checking and pruning, the DPOR algorithm would backtrack to the state before $t_{15}$ and execute $t_{21}$, leading to the new execution trace $\rho'=t_0t_1t_2t_{11}t_{12}t_{13}t_{14}t_{21}t_{26}\ t_{27}\ldots$. Partial order reduction cannot remove $\rho'$ because it is not (Mazurkiewicz) equivalent to ρ and therefore is not deemed as redundant. However, in our method, $CTP_{\rho'}=CTP_\rho$ and therefore $\rho'$ has already been checked by CTP-CHECK-PROPERTY. Consequently, our symbolic pruning will remove this backtrack set: for pfx=$t_0 \ldots t_{14}$, formula $(\Phi_{CTP_\rho^+} \wedge \Phi_{pfx})$ is unsatisfiable. As a result, we skip the trace $\rho'$, backtrack, and directly generate the new trace $\rho''=t_0t_1t_2t_{11}t_{12}t_{21}\ldots$. Since $CTP_{\rho''} \neq CTP_\rho$, and our subsequent call to symbolic checking would report that a linearization of $CTP_{\rho''}$ fails the assertion at $t_5$.

In practice, our pruning happens only when the SAT solver proves that $(\Phi_{CTP^+} \wedge \Phi_{pfx})$ is unsatisfiable; any other possible outcome in practice (satisfiable, timeout, undecided, etc.) means no pruning. This provides crucial flexibility in practical settings to make tradeoffs. For instance, a timeout may be imposed on the SAT solver, to control the time allowed for the pruning computation.

Thus far, we have assumed that the program is structured and the phantom action label (merging points and write-variables) can be efficiently computed a priori. In real-world programs, these assumptions may not hold. We use a safe bailout strategy to deal with abnormals where our assumptions do not hold. When code in a branch have assert(c) statements, non-structured statements (goto, long-jump, etc.), or otherwise complex statements that are difficult for static analysis, we resort to using a phantom edge labeled with assert(false). It is implemented by adding variable assert_fail to WV. If this phantom edge is encountered during a search on a $CTP_\rho^+$, an error will be raised, forcing the algorithm to take the backtrack rather than prune it away.

Figure 7:
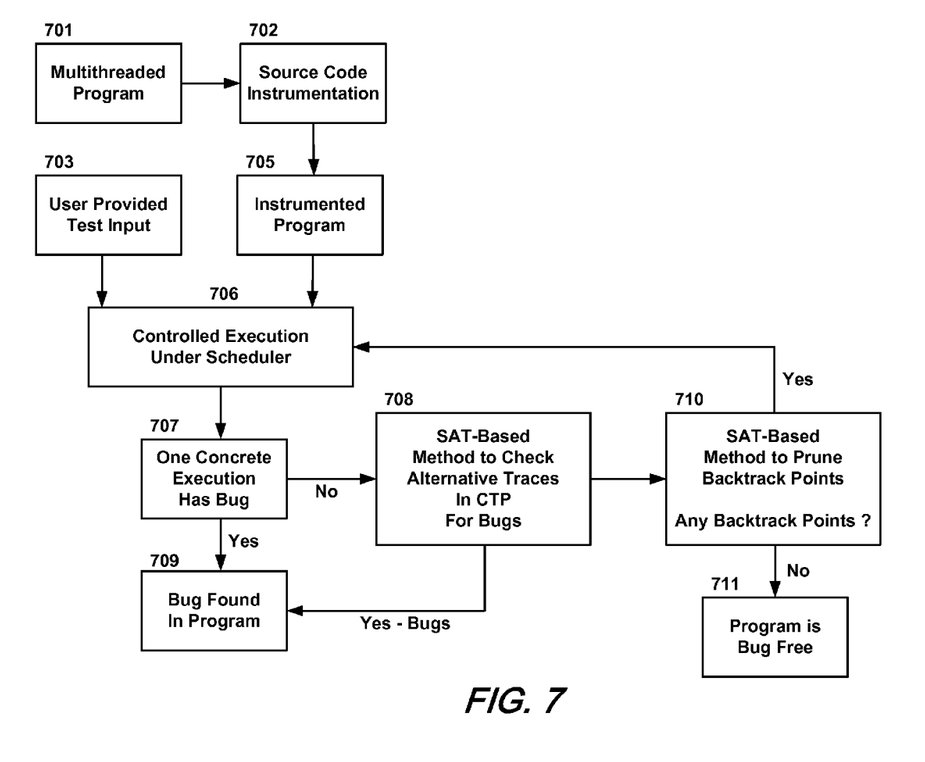
FIG. 7 is a block flow diagram showing an overall method according to the present disclosure.

With these principles of the disclosure in place, we may now describe an overall verification method. With reference now to FIG. 7 there is shown a block flow diagram depicting our inventive method. More particularly a multithreaded program (block 701) is instrumented at a source code level (block 702) thereby producing an instrumented source code program (block 705). User provided test input (block 703) is applied to the instrumented source code program under the control of a controlled execution scheduler (block 706) to produce a concrete execution trace (block 707).

Upon examination, if it is determined that the concrete execution trace has a bug then an indication of the error is generated (block 709). If not, then a determination is made using a SAT-based method whether an alternative trace having the same set of transitions has any bugs (block 708). If so, then a bug is found and an indication of the error is generated (block 709).

If no bugs are found at block (708), then another SAT-based method is used to identify backtrack points (block 710). If no backtrack points are identified, then there all possible traces have been evaluated and no bugs are within the program and the program is determined to be bug-free (block 711). If backtrack points exist (block 710) then the evaluation is returned to block 706 for continued controlled execution under the scheduler.

EXPERIMENTS

We have implemented the symbolic pruning algorithms in the setting of dynamic model checking. Our tool, called Fusion, is capable of handling C programs using the Linux PThreads library. Our enumerative algorithm builds on Inspect, a stateless model checker with dynamic POR. We also use it for our baseline comparison[3]. We use CIL for parsing the C code, collecting write-variables, and code instrumentation. We use the Yices SMT solver to decide the formulas for checking and pruning.

[3] At present, we handle C/C++ programs on the Linux/PThreads platform. Therefore, a direct comparison is difficult to perform against CHESS, another stateless model checker, that targets programs on the Windows platform.

We have compared Fusion with the popular DPOR algorithm implemented in Inspect. DPOR uses the enumerative algorithm with state-of-the-art POR techniques, but does not have symbolic checking and pruning. Two sets of benchmarks were used. The first set consists of parameterized C programs, constructed in-house, with intense shared variable accesses. The LOCs (line of code) of these programs after slicing range from 100 to 200. However, they have a large number of (irredundant) shared variable accesses and therefore are hard concurrency problems. Common C language features (pointers, structures, loops, and recursion) can be found in these programs. The second set consists of the indexer examples from, where they were used to showcase the power of DPOR. These are multithreaded programs where each thread inserts 4 messages into a shared hash table. In all examples, the correctness properties are numerical assertions over the shared variables. All benchmarks are accompanied by test cases to facilitate the concrete execution.

The experiments were conducted on a PC with 1.6 GHz Intel Core Duo processor and 2 GB memory running Fedora 8.

TABLE 1 shows the results on the first set of benchmarks. The first four columns show the statistics of the test cases, including the name, the number of threads, and the number of visible events (accesses to shared variables), and whether the assertion holds. Columns 5-10 compare the two methods in terms of the number of execution traces generated, the number of executed events, and the total runtime in seconds. Both methods exhaustively explore the search space unless a property violation is found. A reduction in the number of traces demonstrates Fusion's pruning capability. In almost all cases, Fusion explores the search space more efficiently by checking only a few traces/CTPs and pruning away the remaining ones. In contrast, DPOR, without any property specific pruning, has to enumerate a large number of trace equivalence classes (in pBch4ok all the equivalence classes). Fusion found the buggy executions in the fa02 examples by SAT and the ones in pBch4 and dynRec by dynamic execution.ds FIG. 6 shows the results on the indexer examples. In this figure, the x-axis is the number of threads and the y-axis is the runtime in seconds to find the bug. The correctness property is an assertion starting that a particular hash entry cannot be over-written. When the number threads is from 1 to 11, there is no hash table collision; but from 12 to 20, there are many collisions among threads (however, these collisions cannot be predicted with sufficient accuracy by a static analysis). For brevity, we present the data only in the range 10-20. The results showed that the symbolic pruning in Fusion has significantly reduced the search space.

Those skilled in the art will readily appreciate that the implementation(s) shown and described herein may be further improved by adding light-weight static analysis to simplify the CTPs before subjecting them to SAT-based algorithms. Additionally, the implementation of context-bounding (a powerful unsound reduction orthogonal to ours) upon our symbolic encoding may further show improvement. Nevertheless, TABLE 1 shows that, even with a preliminary implementation, the overhead of symbolic analysis is well compensated by the savings over pruned traces.

At this point, while we have discussed and described the invention using some specific examples, those skilled in the art will recognize that our teachings are not so limited. Accordingly, the invention should be only limited by the scope of the claims attached hereto.

$t_0: \ x_0 := 0;$ $\quad\ \ y_0 := 0;$ $t_1:$ $t_2:$ $t_{11}: w_1 \leftarrow \pi(y_0, y_1) \quad\quad t_{21}: w_2 \leftarrow \pi(x_0, x_1, x_2)$ $\quad\ \ a_1 := w_1; \quad\quad\quad\quad\ \ \ b_1 := w_2;$ $t_{12}: \text{assume}(a_1 = 0) \quad\ \ t_{26}: \text{assume}(b_1 \neq 0)$ $t_{13}: x_1 := 1; \quad\quad\quad\quad\ \ t_{27}: y_1 := 0;$ $t_{14}: w_3 \leftarrow \pi(x_1) \quad\quad\quad t_{28}:$ $\quad\ \ a_2 := w_3 + 1;$ $t_{15}: x_2 := a_2;$ $t_{18}:$ -continued $t_3:$ $t_4:$ $t_5: w_4 \leftarrow \pi(x_2)$ $w_5 \leftarrow \pi(y_1)$ -continued $w_5 \leftarrow \pi(y_2, y_3)$ $\text{assert}(w_4 \neq w_5);$ Example 2

TABLE 1

| Test Program | | | | Fusion (in C3) | | | DPOR (in Inspect) | | |
|---|---|---|---|---|---|---|---|---|---|
| name | # threads | global-ops | property | traces | transitions | time (s) | traces | transitions | time (s) |
| fa02-1 | 2 | 21 | false | 1 | 32 | 0.2 | 34 | 545 | 6.6 |
| fa02-5 | 2 | 73 | false | 1 | 84 | 0.8 | 190 | 8349 | 47.5 |
| fa02-10 | 2 | 138 | false | 1 | 149 | 1.4 | 390 | 29904 | 108.6 |
| pBch4-5 | 2 | 28 | false | 2 | 59 | 0.5 | 64 | 472 | 13.8 |
| pBch4-10 | 2 | 48 | false | 2 | 89 | 0.6 | 274 | 2082 | 55.9 |
| pBch4-20 | 2 | 88 | false | 2 | 149 | 1.3 | 1144 | 10842 | 248.7 |
| pBch4ok-1 | 2 | 12 | true | 4 | 49 | 1.9 | 5 | 50 | 1.4 |
| pBch4ok-3 | 2 | 28 | true | 11 | 211 | 6.9 | 152 | 1445 | 32.7 |
| pBch4ok-4 | 2 | 36 | true | 18 | 385 | 19.6 | 1164 | 10779 | 255.8 |
| pBch4ok-5 | 2 | 44 | true | 27 | 641 | 40.1 | — | — | >3600 |
| dynRec-0 | 2 | 18 | false | 1 | 16 | 3.1 | 3 | 32 | 1.1 |
| dynRec-1 | 3 | 36 | false | 3 | 63 | 3.3 | 788 | 7852 | 534.0 |
| dynRec-2 | 4 | 54 | false | 5 | 131 | 7.9 | — | — | >3600 |
| dynRec-3 | 5 | 72 | false | 7 | 219 | 17.2 | — | — | >3600 |
| dynRec-4 | 6 | 90 | false | 9 | 327 | 35.3 | — | — | >3600 |
| dynRec-5 | 7 | 108 | false | 11 | 455 | 71.5 | — | — | >3600 |
| dynRec-6 | 8 | 126 | false | 13 | 603 | 106.4 | — | — | >3600 |

-continued $\text{assert}(w_4 \neq w_5);$

Example 1

$t_0: x_0 := 0;$ $y_0 := 0;$ $t_1:$ $t_2:$ $t_{11}: w_1 \leftarrow \pi(y_0, y_1, y_3)$  $\quad t_{21}: w_2 \leftarrow \pi(x_0, x_1, x_2, x_3)$ $\quad a_1 := w_1;$ $\quad b_1 := w_2;$ $t_{12}: \text{assume}(a_1 = 1)$ $\quad t_{ph2}: \text{assume}(b_1 = 1)$ $t_{13}: x_1 := 1;$ $\quad y_1 \leftarrow *$ $t_{14}: w_3 \leftarrow \pi(x_1)$ $\quad y_2 \leftarrow *$ $\quad a_2 := w_3 + 1;$ $\quad b_2 \leftarrow *$ $t_{15}: x_2 = a_2;$ $t_{ph1}: \text{assume}(a_1 \neq 1)$ $\quad t_{26}: \text{assume}(b_1 \neq 1)$ $\quad x_3 \leftarrow *$ $\quad t_{27}: y_3 = 0;$ $\quad x_4 \leftarrow *$ $t_{18}: a_3 \leftarrow \phi(a_1, a_2)$ $\quad t_{28}: b_3 \leftarrow \phi(b_1, b_2)$ $t_3:$ $t_4:$ $t_5: w_4 \leftarrow \pi(x_2, x_4)$

The invention claimed is:

1. A method for determining the correctness of a concurrent software program, said method comprising the computer implemented steps of:
   partitioning the concurrent software program into a number of concurrent trace programs (CTPs);
   applying a satisfiability method (SAT) to each of the CTPs in isolation;
   determining whether a property violation occurs within the CTP as a result of the SAT;
   determining whether the CTP is redundant with respect to the property; and
   outputting an indicia of the determination.

2. The method of claim 1 further comprising the computer implemented steps of:
   generating a set of concrete traces from which the CTPs are determined.

3. The method of claim 2 further comprising the steps of:
   evaluating, using the SAT method, all feasible executions of the CTPs.

4. The method of claim 2 further comprising the steps of:
   generating an abstraction of the CTPs; and
   determining using the SAT method, an indication of whether the abstraction is error free.

5. The method of claim 4 further comprising the steps of:
   identifying, using the abstraction determination, whether other CTPs are redundant with respect to the property.

6. The computer implemented method of claim 1 operating in a stateless dynamic model checking system.

7. The method of claim 3 wherein the SAT method uses an efficient symbolic encoding based on a Concurrent Static Single Assignment (CSSA) form.

8. The method of claim 1 wherein said concurrent trace program $CTP_\rho$ is a partially ordered set $(T, \sqsubseteq)$, where $T=\{t|t$ is an event in $\rho\}$, and $\sqsubseteq$ is the partial order such that, for two arbitrary events $t_i, t_j \in T$, we have $t_i \sqsubseteq t_j$ iff i=j, or one of the following conditions holds:

tid($t_i$)=tid($t_j$) and i<j in ρ, tid($t_i$)≠tid($t_j$) and there exist $t_k$, $t_l \in T$ such that $t_i \sqsubseteq t_k$, $t_l \sqsubseteq t_j$, and either $t_k$ has action fork(tid($t_l$)), or $t_l$ has action join(tid ($t_k$));

wherein ρ is an execution trace of the concurrent software program.

9. A computer implemented method for determining the correctness of a concurrent software program using dynamic model checking, said method comprising the computer implemented steps of:

determining a set of concrete executions for the software program;

partitioning the software program into a set of concurrent trace programs (CTPs) determined from the set of concrete executions;

checking each CTP for errors in isolation through the effect of a satisfiability analysis (SAT);

pruning redundant CTPs from the set of CTPs;

outputting an indicia of the correctness of the CTPs.

10. The method of claim 9 wherein said concurrent trace program $CTP_\rho$ is a partially ordered set(T, $\sqsubseteq$), where T={t|t is an event in ρ}, and $\sqsubseteq$ is the partial order such that, for two arbitrary events $t_i$, $t_j \in T$, we have $t_i \sqsubseteq t_j$ iff i=j, or one of the following conditions holds:

tid($t_i$)=tid($t_j$) and i<j in ρ, tid($t_i$)≠tid($t_j$) and there exist $t_k$, $t_l \in T$ such that $t_i \sqsubseteq t_k$, $t_l \sqsubseteq t_j$, and either $t_k$ has action fork(tid($t_l$)), or $t_l$ has action join(tid ($t_k$));

wherein ρ is an execution trace of the concurrent software program.

* * * * *